(12) United States Patent
Fisher et al.

(10) Patent No.: US 6,229,762 B1
(45) Date of Patent: May 8, 2001

(54) ACOUSTIC SENSOR FOR A POINT IN SPACE

(75) Inventors: Stanley A. Fisher, Boyds, MD (US); Larry S. Chandler, Falls Church, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/703,276

(22) Filed: Aug. 26, 1996

(51) Int. Cl.[7] .............................. G01H 9/00; H04R 23/00
(52) U.S. Cl. ................................................ 367/149; 73/655
(58) Field of Search .................................. 367/149, 152; 310/334; 73/655, 657

(56) References Cited

U.S. PATENT DOCUMENTS

| | | | |
|---|---|---|---|
| 4,162,397 | 7/1979 | Bucaro et al. | 250/199 |
| 4,297,887 | 11/1981 | Bucaro | 73/655 |
| 4,363,114 | 12/1982 | Bucaro et al. | 367/149 |
| 4,994,668 | 2/1991 | Lagakos et al. | 250/227.19 |
| 5,107,709 | * 4/1992 | McCarty | 73/655 |
| 5,140,559 | 8/1992 | Fisher | 367/149 |
| 5,155,707 | 10/1992 | Fisher | 367/149 |
| 5,175,709 | * 12/1992 | Slayton et al. | 367/162 |
| 5,590,653 | * 1/1997 | Aida et al. | 128/653.2 |

\* cited by examiner

*Primary Examiner*—Ian J. Lobo
(74) *Attorney, Agent, or Firm*—John Forrest; Jacob Shuster

(57) ABSTRACT

The invention is directed to a fiber-optic sensor for measuring acoustic signals originating from a single point remote from the sensor. The sensor includes a sensing cable formed with a light transmitting optical fiber core encased within an acoustically sensitive jacket that is bonded to the optical fiber core; a reference cable formed with a light transmitting optical fiber core encased within a protective jacket that is not bonded to the optical fiber core; a base structure forming a concave surface having a focal point that corresponds to the point in space from which acoustic measurements are desired; an acoustically sensitive surface formed by mounting the sensing cable and the reference cable in a collocated pair onto the concave surface; a coherent light source connected to and transmitting light to the sensing optical fiber and the reference optical fiber; and an electro-optic processor connected to and receiving transmitted light from the sensing optical fiber and the reference optical fiber and suitable for determining phase shift differences between transmitted light from the sensing and reference optical fibers.

4 Claims, 2 Drawing Sheets

ACOUSTIC SENSOR FOR A POINT IN SPACE

CROSS REFERENCE TO RELATED APPLICATIONS

This application is related to the following co-owned patents of the present inventor: U.S. Pat. No. 5,140,559 issued Aug. 18, 1992, and U.S. Pat. No. 5,155,707 issued Oct. 13, 1992, both patents incorporated herein by reference.

STATEMENT OF GOVERNMENT RIGHTS

The invention described herein may be manufactured and used by or for the Government of the United States of America for governmental purposes without the payment of any royalties thereon or therefor.

BACKGROUND OF THE INVENTION

1. Field of Invention

The present invention relates generally to acoustic sensors and, more particularly, to fiber optic acoustic sensors for monitoring a point in space remote from the sensor. Such monitoring is achieved by the provision of acoustic sensor for a point in space a compact and economical sensor for measuring low acoustic energy and spatially localized processes.

2. Brief Description of Related Art

Methods of measuring localized acoustic energy signals are known. For example, parabolic reflectors have been used to focus acoustic input signals on a single acoustic sensor located at the focal point of the parabolic reflector. However, parabolic reflectors receive all acoustic energy signals originating from a particular direction rather than from only a desired point of interest. Thus, unwanted noise is measured and other acoustic techniques may be required to detect and isolate the desired acoustic signals. Moreover, for a parabolic sensor to localize an acoustic signal in three dimensions the sensor must be moved so that the acoustic signals originating from a point of interest may be detected and measured from more than one location.

An array of acoustic sensors arranged in a beamformed planar array may also be used to isolate a desired acoustic process originating from a point in space by adding the desired signal in phase. However, to detect signals at reasonably high frequencies a uniform sensing surface requires a large number of sensors. Such an arrangement is limited by cost, weight and space requirements. Additionally, beamformed arrays introduce electromagnetic noise and are sensitive to electromagnetic noise. Such electromagnetic noise may originate, for example, from x-ray machines or magnetic based medical diagnostic equipment.

Thus, there is a need for a compact, economical acoustic sensor that is capable of isolating and measuring acoustic energy signals originating from a point of interest, whether that point be in air, water or a human or animal body.

SUMMARY OF THE INVENTION

Accordingly, it is an object of the present invention to provide an acoustic sensor capable of detecting and isolating acoustic energy signals originating from a point in space remote from the sensor.

It is a further object of the present invention to provide an acoustic sensor suitable for monitoring point in space acoustic signals originating in either air or water.

It is still a further object of the present invention to provide an acoustic sensor suitable for monitoring point in space acoustic signals originating in a human or animal body.

It is yet another object of the present invention to provide a fiber optic sensor for measuring low acoustic energy signals originating from a point in space remote from the sensor that is capable of canceling vibration and other noise associated with movement of the sensor and with location of the sensor relative to sources of thermal or electromagnetic interference.

Other objects and advantages of the present invention will become apparent to those skilled in the art upon a reading of the following detailed description taken in conjunction with the drawings and the claims supported thereby.

In accordance with the present invention, an improved acoustic sensor for detecting acoustic energy originating from a point in space is provided. The sensor includes a base structure having a concave surface formed thereon, and means for detecting acoustic energy. The detecting means includes acoustic sensing means mounted on the concave surface to form an acoustically sensitive surface and means for processing output signals from the sensing means. The concave surface has a focal point associated therewith that corresponds to the point in space from which acoustic measurements are desired. The detecting means may further include a reference means for providing an acoustic reference signal to the processing means, and means for transmitting coherent light to the acoustic sensing means and the reference means.

In a preferred embodiment of the present invention, the acoustic sensing means comprises a sensing cable including a light transmitting optical fiber core encased within an acoustically sensitive jacket and a soft silicone buffer layer surrounding the optical fiber core between the optical fiber core and the acoustically sensitive jacket. The buffer layer of the sensing cable is bonded to both the optical fiber core and the acoustically sensitive jacket resulting in the acoustically sensitive jacket being bonded to the optical fiber core. The reference means comprises a reference cable including a light transmitting optical fiber core encased within a protective jacket and a soft silicone buffer layer surrounding the optical fiber core between the optical fiber core and the protective jacket wherein the protective jacket is not bonded to the optical fiber core. The means for processing output signals is an electro-optical unit receiving transmitted light from the acoustic sensing means and the reference means and suitable for determining a phase shift differences between transmitted light received from the acoustic sensing means and the reference means.

In a more preferred embodiment, the sensing and reference cables are configured as a collocated pair configured in a coil on the concave surface wherein the concave surface is a partial sphere. The sensing and reference cables are encased within an acoustically transparent material, either independently or as a pair. The coiled collocated pairing forms the acoustically sensitive surface mounted on the concave surface of the base structure.

In a further embodiment of the present invention, a fiber-optic sensor for measuring acoustic signals originating from a point remote from the sensor is provided. The sensor includes: a base forming a three-dimensionally curved concave surface having a focal point associated therewith; means, having optical characteristics that vary when subjected to acoustic impingement, for sensing acoustic energy; means, having optical characteristics that are insulated from acoustic impingement, for sensing vibration signals; the means for sensing acoustic energy and the means for sensing vibration signals configured to form a continuous acoustically sensitive layer on at least a portion of the concave surface; means for providing coherent light to the means for sensing acoustic energy and the means for sensing vibration signals; and means for processing output from the means for sensing acoustic energy and the means for sensing vibration signals. The fiber-optic sensor provides a low vibration noise acoustic signal that originates from the focal point. The means for sensing acoustic energy comprises a fiber-optic core having an acoustically sensitive jacket continuously bonded thereto and is wound in a spiral pattern on the concave surface. The means for detecting vibration signals comprises a fiber-optic core having a jacket that is not bonded thereto and is wound in a spiral pattern on the concave surface.

In the above embodiments, the sensor may include means for locating the focal point of the concave surface. The locating means includes three or more light sources distributed peripherally about the base. Each of the light sources projects light such that the projected light intersects at the focal point producing a visual indication of the focal point.

A preferred application of the present invention is to measure acoustic signals originating in a human or animal body. When used for such an application, the sensor includes means, juxtapositioned between the body and the acoustically sensitive surface, for substantially matching the acoustic impedance of the body. The acoustic impedance matching means preferably comprise a flexible container containing a fluid having an acoustic impedance substantially corresponding to the acoustic impedance of the body. The flexible container has a first surface abutting the acoustically sensitive surface and a second surface capable, when abutting the body, of conforming to the shape of the body. Alternatively, the sensor could monitor sources inside of human or animal bodies by immersing the sensor and body into an impedance matching fluid.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding element throughout and wherein.

DETAILED DESCRIPTION OF THE PREFERRED EMBODIMENT

Figure 1:
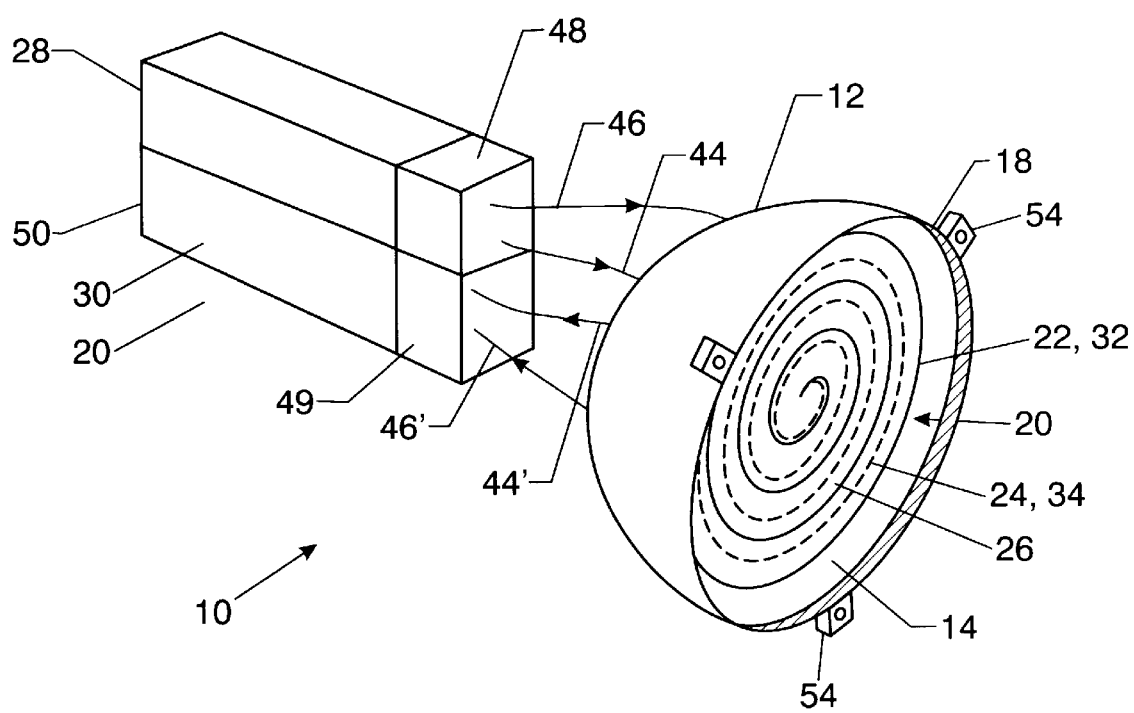
FIG. 1 is a perspective view of the acoustic sensor for a point in space.
Figure 4:
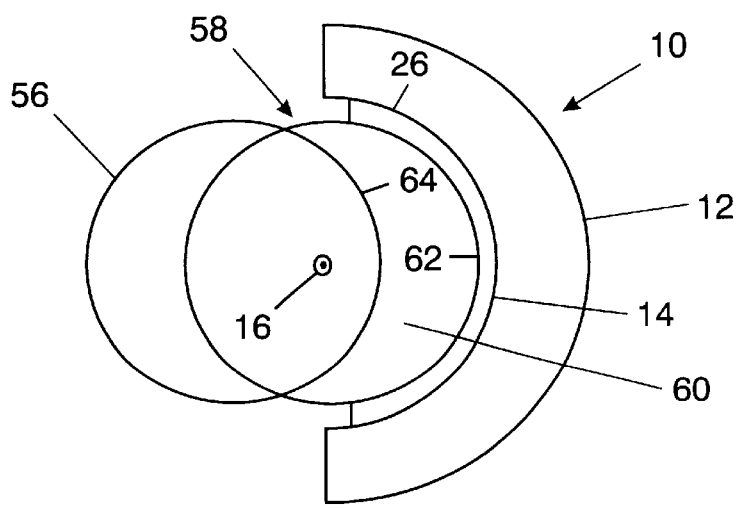
FIG. 4 is a top view depicting a preferred application of the acoustic sensor, i.e., monitoring internal biological processes for medical purposes.

Referring now to the drawings, and particularly to FIG. 1, the acoustic sensor of the present invention, designated generally by the reference numeral 10, is shown. The major components of sensor 10 include: base structure 12 having three-dimensionally curved, concave surface 14 formed thereon; and detecting means 20 for detecting a localized acoustic energy signal originating from a point remote from sensor 10. Base structure 12 defines concave surface 14. Concave surface 14 may be any curved surface having a focal point 16 associated therewith as shown in FIG. 4. However, in a preferred embodiment, concave surface 14 is a partial sphere having a focal point 16 located at the center of the full spherical shape. Base structure 12 further includes outer peripheral edge portion 18.

Detecting means 20 includes acoustic sensing means 22 mounted on concave surface 14 to form an acoustically sensitive surface layer 26 on at least a portion of concave surface 14 and processing means 30 for processing output signals from sensing means 22. Acoustic sensing means 22 senses acoustic signals representing the acoustic energy originating from focal point 16 that impinge on acoustically sensitive surface layer 26, and provides the signals to processing means 30.

Sensing means 22 preferably take the form of an optical fiber. Alternatively, sensing means 22 may be a piezoelectric polymer cable, e.g., polyvinylidene fluoride (PVDF). The PVDF cable is mounted on concave surface 14, preferably in a spiral pattern, to form acoustically sensitive surface layer 26. PVDF directly converts acoustic pressure into voltage which can be measured across the ends of the PVDF spiral sensor by a suitable processing means 30.

Figure 2:
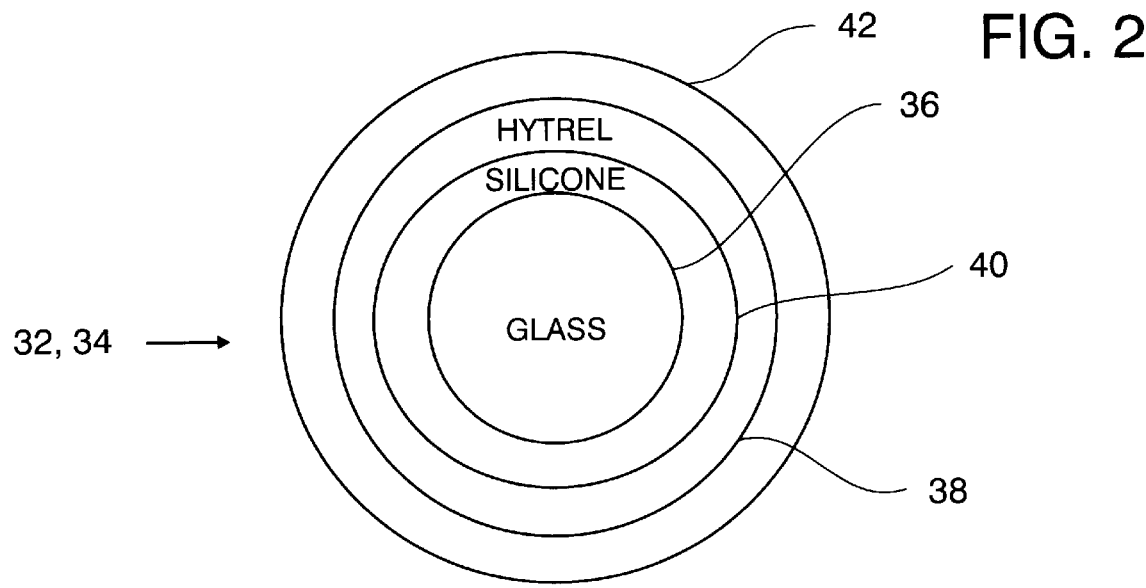
FIG. 2 is a cross sectional view representing a preferred embodiment of the sensing cable or the reference cable used to form the acoustically sensitive surface of the present invention.

Detecting means 20 may further include reference means 24 for providing an acoustic reference signal to processing means 30. A preferred embodiment of sensing means 22 and reference means 24 is shown in FIG. 2. FIG. 2 depicts, under different circumstances, a cross-sectional representation of the component layers of either acoustic sensing means 22 or reference means 24. Acoustic sensing means 22 comprises sensing cable 32 including light transmitting glass/silicone optical fiber core 36 encased within acoustically sensitive jacket 38 and soft silicone buffer layer 40 surrounding optical fiber core 36 between optical fiber core 36 and acoustically sensitive jacket 38. Buffer layer 40, which prevents microbending of optical fiber core 36, thus, preventing resulting acoustic signal loss, is bonded to both optical fiber core 36 and acoustically sensitive jacket 38. Consequently, acoustically sensitive jacket 38 is bonded to optical fiber core 36. Reference means 24 comprises reference cable 34 including a light transmitting optical fiber core 36 encased within protective jacket 38 and soft silicone buffer layer 40 surrounding optical fiber core 36 between optical fiber core 36 and protective jacket 38 such that protective jacket 38 is not bonded to optical fiber core 36. In this case, as in FIG. 1, sensor 10 includes coherent light source 28 for providing a light source to acoustic sensing means 22 and reference means 24. The preferred materials of jacket 38 (both the acoustically sensitive jacket and the protective jacket) is polyester, e.g., HYTREL® manufactured by DuPont.

By bonding the three layers of sensing cable 32 together, sensing cable 32 is made highly sensitive to acoustic energy. In contrast, reference cable 34, without bonding between acoustically sensitive protective jacket 38 and optical fiber core 36, is far less sensitive to acoustic energy and, therefore, is insulated from impinging acoustic energy waves. This is important because the vibrational induced noise and impinging acoustic signals are in the same frequency range and, therefore, cannot be filtered by conventional means.

It is well known that acoustically sensitive material deform as a result of pressure fluctuations induced by impinging acoustic energy. The jackets of sensing cable 32 and reference cable 34 experience a deformation as a result of impinging acoustic energy signals. By bonding acoustically sensitive jacket 38 to optical fiber core 36 of sensing cable 32, deformations of acoustically sensitive jacket 38 are transferred to underlying acoustically sensitive optical fiber core 36. Consequently, optical fiber core 36 of sensing cable 32 deforms as a result of pressure fluctuation induced by impinging acoustic energy. The pressure induced strain within optical fiber core 36 causes changes in both the index of refraction of the core and the length of the optical fiber. The result is a change in the optical path length of light travelling through optical fiber core 36 of sensing cable 32.

The unbonded jacket 38 of reference cable 34, on the other hand, does not effectively transmit the acoustic energy induced deformation to underlying acoustically sensitive optical fiber core 36. As a result, the optical path length of light traveling through reference cable 34 is not affected by impinging acoustic energy. The resulting acoustic energy induced difference in optical path lengths between the sensing and reference cables induces a difference in the phase shift between light traveling through the two cables. This phase shift difference is detected by processing means 30.

In contrast, both sensing cable 32 and reference cable 34 are affected equally by vibrational inputs and, therefore, the light traveling through the two cables experience identical phase shifts due to vibration. Since there is no phase difference between the two cables as a result of vibration, the phase difference of the light traveling through sensing cable 32 and reference cable 34 is directly related to the impinging acoustic energy level. Moreover, both sensing cable 32 and reference cable 34 are affected equally by thermal and electromagnetic radiation and thus cancel any noise induced thereby. Additionally, when sensing cable 32 and reference cable 34 are mounted in close physical relationship to one another they are affected equally by deformations of base structure 12 and thus cancel any noise induced thereby.

Reference cable 34 may be mounted remote from sensing cable 32, for example, within processing means 30. Preferably, for better common mode rejection and to cancel induced noise resulting from vibration, movement or deformation of sensor 10 or from thermal or electromagnetic radiation interference, reference cable 34 may be mounted in a parallel paired arrangement with sensing cable 32. In either case, both sensing cable 32 and reference cable 34 are further encased in acoustically transparent material 42. Further discussions will assume that sensing and reference cables, 32 and 34, are arranged as a collocated pair. Thus, acoustically sensitive surface 26 is formed by mounting sensing cable 32 and reference cable 34 in a collocated pair onto concave surface 14 of base structure 12.

In a preferred embodiment, sensing cable 32 is formed in a spiral configuration which is encased in an acoustically transparent elastomer material 42. The preferred elastomer material is polyurethane, e.g., uralite. However, any compliant and acoustically transparent material may be used. Reference cable 34 is also formed in a spiral configuration in the same elastomer material and is further arranged in a paired arrangement with the sensing cable 32. This pattern allows reference cable 34 to be located adjacent to sensing cable 32 at all points along the spiral winding. Because both cables lie in approximately the same location both are subject to the same vibrational inputs. By thus locating the cables in paired windings, signals caused by vibration or deformation of base structure 12 are sensed equally by both sensing cable 32 and reference cable 34.

Sensing cable 32 and reference cable 34 are connected to light source 28 and processing means 30 through sensing cable leads 44 and 44' and reference cable leads 46 and 46', respectively. Coherent light source 28 may be any available source providing coherent light, but is preferably a standard fiber-optic laser light source. In one embodiment, a laser emitting at a wavelength of 800 nM is preferred. In a second embodiment, a laser emitting at a wavelength of 1300 nM is preferred. Light from coherent light source 28 is split into two parts by light splitter 48 as diagrammed in FIG 3. One part of the light enters sensing cable 32 through lead 44, travels through sensing cable 32, exits sensing cable 32 through lead 44', and enters processing means 30. A second part of the light enters reference cable 34 through lead 46, travels through reference cable 34, exits reference cable 34 through lead 46', and enters processing means 30.

Processing means 30 for processing output signals from sensing and reference cables, 32 and 34, may be a combination of any of a variety of well known photodetectors and demodulators available in the art and preferably takes the form of an electro-optical processor 50 such as a Mach Zehnder interferometer system. Electro-optical processor 50 is connected to and receives transmitted light from sensing cable 32 and reference cable 34 and is suitable for determining differences in induced phase shift between transmitted light from sensing and reference cables, 32 and 34, and converting the acoustic generated phase shift (interference pattern) into an amplitude dependent voltage signal.

Upon exiting sensing and reference cables, 32 and 34, signals are recombined at signal combiner 49, and are transmitted to electro-optic processor 50 obtaining a phase modulated signal through the Doppler effect. The preferred embodiment of electro-optic processor 50 (designed by the Naval Research Laboratory and fabricated by Optech, Inc.) employs a synthetic heterodyne demodulation technique for interrogating the phase modulated signal. One such synthetic heterodyne demodulation technique is disclosed in U.S. Pat. No. 4,363,114, herein incorporated by reference. Other suitable demodulation techniques may be employed, e.g., homodyne demodulation. Preferably, processor 50 includes a photo-voltage converter, an optical phase detector and a pre-amplifier (known and thus not shown).

Figure 3:
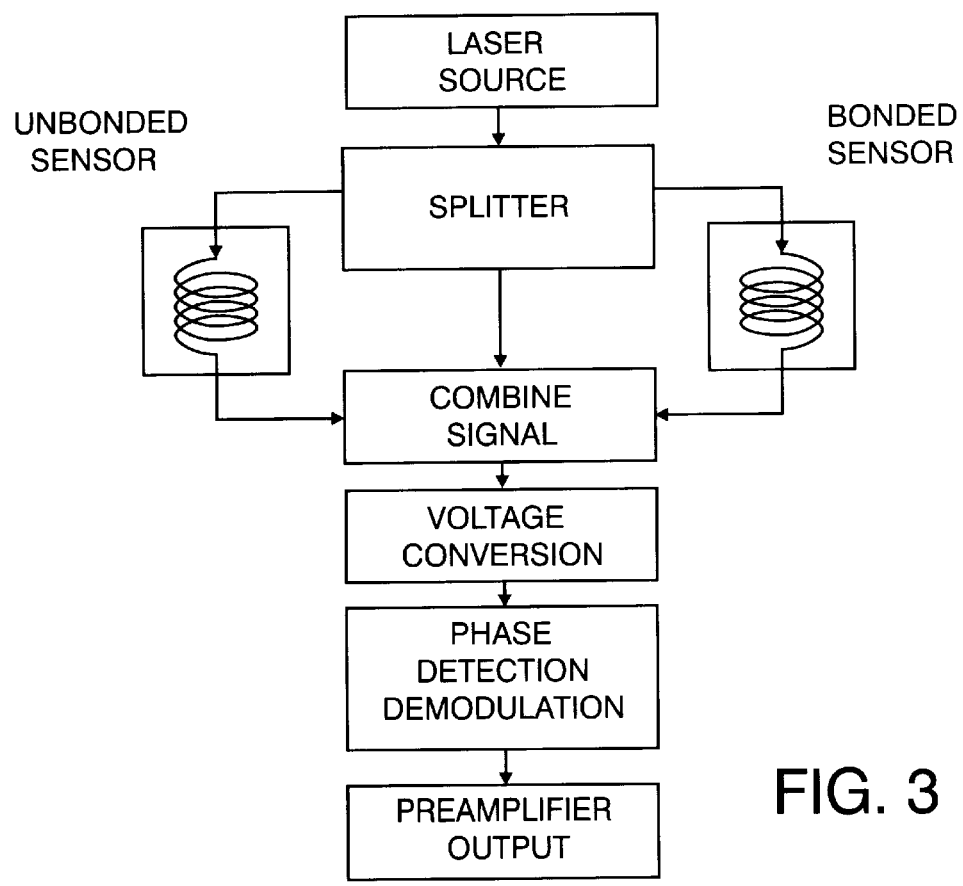
FIG. 3 is a diagram depicting the operation of one possible embodiment of the present invention.

Operation of the sensor 10 may be seen by reference to FIG. 3, wherein a block diagram depicts its functional components. Light source 28 provides a coherent light signal to splitter 48 which sends part of the signal to bonded sensing cable 32 and part to the unbonded reference cable 34. The output signals from the two cables are then recombined and passed through the photo-voltage converter, optical phase detector and pre-amplifier to detect the induced phase shift difference between sensing cable 32 and reference cable 34, thus isolating the impinging acoustic signals from the vibration induced noise. As a result, the signal is processed to provide a voltage that is proportional to real time acoustic pressure originating from focal point 16.

Sensor 10 receives acoustic information in a correlated manner from a point in space corresponding to focal point 16 of concave surface 14. That is, acoustic signals originating from focal point 16 are received at all points on acoustically sensitive surface 26 at substantially the same time. In a preferred embodiment, curved surface 14 has a spherical contour and focal point 16 is defined by the center of the spherical or partial spherical surface 14 upon which acoustically sensitive layer 26 is mounted.

Sensor 10 has good sensitivity in both air and water. When operating sensor 10 in air or water, it is useful to have a visual indication of exactly where sensor 10 is focused. Thus, the present invention may also include locating means 52 for locating focal point 16 from which the acoustic energy originates. Locating means 52 may include light sources 54 located on base structure 12 and focused on focal point 16. Preferably, three light sources 54 are distributed peripheral about outer edge portion 18 of base 10. Each of light sources 54 projects light such that the projected light intersects at focal point 16 producing a visual indication of focal point 16. If light sources 54 are complementary lights (e.g., red, yellow and green), they will produce a white light only at their point of intersection, i.e., at focal point 16.

One preferred application of acoustic sensor 10, as depicted in FIG. 4, is for monitoring internal biological processes for medical purposes. Thus, sensor 10 functions to measure acoustic signals originating in a human or animal body, represented symbolically in FIG. 4 as item 56. The use of sensor 10 for monitoring acoustic phenomena in body 56 is different than monitoring acoustic phenomena in air or water. In air or water, the acoustic energy propagates from focal point 16 to acoustically sensitive surface 26 through a homogeneous medium having a substantially constant density, material impedance and speed of sound. Consequently, no sound energy attenuation or sound refraction, due to impedance mismatch, is experienced by the signals while in transit from focal point 16 to acoustically sensitive surface 26. However, in medical applications, the point of interest is in a human or animal body, which has a different density and speed of sound than air. Consequently, when monitoring acoustic phenomena in a human or animal body, as the acoustic energy propagates from the point of interest, i.e., focal point 16, to sensor 10, it experiences a fluid/air interface at the body surface which creates a large impedance mismatch, causing both refraction of the sound paths and energy loss due to reflection at the surface.

In order to minimize the impedance mismatch in medical applications, sensor 10 includes acoustic impedance matching means 58 for substantially matching an acoustic impedance of body 56. Means 58 is juxtapositioned between body 56 and acoustically sensitive surface 26. In a preferred embodiment, impedance matching means 58 comprises flexible container 60 having therein a fluid that substantially corresponds to the acoustic impedance of body 56, e.g., a water filled bag. At least a portion of container 60 is positioned within a space defined by concave surface 14. First surface 62 of container 60 abuts acoustically sensitive surface 26 and second surface 64 of container 60 is capable of conforming to the shape of body 56 when placed in contact with body 56. Alternatively, both sensor 10 and body 56 may be immersed in a fluid filled tank resulting in a substantially impedance matching fluid being positioned continuously between body 56 and acoustically sensitive surface 26.

The present invention provides an economical and easily produced sensor capable of measuring acoustic phenomenon originating from a point of interest. For example, sensor 10 may be produced by the following sequence: 1) Fill a shallow circular pan with a predetermined amount of uncured acoustically transparent material 42, e.g., polyurethane elastomer, and allow it to cure; 2) lay a predetermined length of sensing cable 32 in a spiral pattern onto a double backed adhesive surface to form a sensing coil; 3) lay the sensing coil, with the unused adhesive side down, on the surface of the cured acoustically transparent material 42; 4) lay another predetermined amount of acoustically transparent material 42, e.g., polyurethane elastomer, on top of the sensing coil and allow it to cure to produce a sensing coil encapsulated in acoustically transparent material 42; 5) cut the encapsulated sensing coil between the spiral pattern to produce a spiral sensing cable 32 encased with acoustically transparent material 42; 6) mount the encased sensing cable 32 onto concave surface 14 of base structure 12 in a continuous spiral pattern covering a predetermine area of concave surface 14 to produce acoustically sensitive surface layer 26 on concave surface 14; 7) connect sensing cable leads 44 and 44' to light source 28 and electro-optic processor 50, respectively. A particular example following the above sequence utilizes an approximately 2 foot diameter circular pan, approximately 21 feet of sensing and/or reference cable, and approximately one quarter inch of polyurethane on top and bottom of the spiral configuration.

Reference cable 34 may be separate from acoustically sensitive surface 26. Alternatively, reference cable 34 may be incorporated into acoustically sensitive surface 26 either by laying up reference cable 34 separately, as steps 1) through 5) of the above described sequence, and then co-winding sensing cable 32 and reference cable 34 onto concave surface 14 in a collocated spiral pattern as in step 6), or by laying up sensing cable 32 and reference cable 34 together in a collocated pattern during step 2) above.

If acoustically sensitive surface layer 26 is mounted on a flat planar surface, sensor 10 will act as an array of sensors located in a plane, with the typical acoustical receiver beam pattern, but without the expense of placing many sensors on the surface as in the prior art. For example, if formed into an 18 inch circular disk, approximately 134 conventional sensors would be required to gain optimal array performance (i.e., lambda/2 spacing) at 6 kHz. The array gain would be approximately the same, i.e., 21 dB, but the sensor formed using the acoustically sensitive surface layer 26 of the present invention would cost substantially less to produce.

The advantages of the present invention are numerous. The present acoustic sensor for a point in space provides an economical, compact, lightweight, sensor capable of isolating acoustic phenomenon originating from a single point of interest whether it be a chemical, manufacturing, physiological or hydrodynamic phenomenon. A virtually continuous sensor may be formed on the concave surface of a range of geometric shapes. In particular, when arranged on the inside surface of a partial sphere, the sensor provides the ability to monitor a point in space, with a large array gain using a single low cost sensor means, i.e., continuous sensing cable forming a sensing surface. In air, the array gain should be equivalent to a planar surface of the same surface area populated with point sensors at lambda/2 spacing, i.e., approximately 21 dB at 6 kHz. Gain may be even better at higher frequencies due to the continuous spiral sensor providing sensitivity in a continuous line rather than the discrete point of a point sensor array.

Additionally, the sensor provides a unique structure in that the sensing and reference cables are everywhere collocated by use of the paired spiral windings. The combination of collocated fiber-optic cables and the bonded and unbonded acoustically sensitive jackets on the sensing and reference cables, respectively, provides a unique result. Because both sensing and reference cables are encased within the same elastomer material, both receive identical vibrational inputs. However, only the sensing cables, wherein the acoustically sensitive jacket is bonded to the optical fiber, is affected by acoustic signals. The detection process only measures resultant phase differences, thus effectively canceling any vibration induced signals. The result occurs even though the vibration and acoustic inputs are in the same frequency range. The acoustically transparent material which encapsulates the array of fiber-optic windings protects the array without reducing acoustic sensitivity.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. The forms of the present invention herein described are not intended to be limiting but are merely preferred or exemplary embodiments thereof.

What is claimed is:

1. An acoustic sensor for monitoring acoustic energy comprising: a base structure forming a concave surface having a focal point associated therewith; elongated sensing means on said surface for detecting said acoustic energy originating in spaced relation to said concave surface at said focal point; means for processing output signals from said elongated sensing means produced in response to simultaneous impingement of the acoustic energy therealong from the focal point, and means for indicating location of said focal point from which the acoustic energy being monitored originates, including three light sources distributed peripherally about said base structure, each of said light sources projecting light such that said projected lights intersect at said focal point whereby said intersection produces a visual indication of said focal point.

2. In combination with an acoustic sensor including a detection surface to which acoustic energy is transmitted through an acoustical impedance matching medium from an acoustic source being monitored by impingement of said acoustic energy on a pair of fiber-optic cables operatively mounted on said detection surface and through which coherent light is transmitted during generation therein of acoustic signals in response to said impingement thereon of the acoustic energy, said detection surface having a focal point and data processing means connected to said pair of fiber-optic cables for detection of the acoustic signals isolated from vibration induced signals; the improvement residing in: means restrictively positioning the detection surface for location of the acoustic source at said focal point to establish said impingement of the acoustic energy simultaneously all along one of the pair of the fiber-optic cables on said detection surface which is concave and has a continuous perimeter; and said means restrictively positioning the detection surface includes locating means mounted on said perimeter for indicating said location of the acoustic source being monitored at the focal point.

3. The combination as defined in claim 2 wherein the acoustical impedance matching medium is air or water within which the focal point is located.

4. The combination as defined in claim 2 wherein the acoustical impedance matching medium is a shape conforming container of fluid in contact with the concave detection surface and an animal body within which the focal point is located.

* * * * *